(12) United States Patent
Fu et al.

(10) Patent No.: US 12,446,090 B2
(45) Date of Patent: Oct. 14, 2025

(54) MULTI-LINK OPERATION

(71) Applicant: Hewlett Packard Enterprise Development LP, Spring, TX (US)

(72) Inventors: Xiaoyang Fu, Beijing (CN); Xuguang Jia, Beijing (CN); Guangzhi Ran, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 377 days.

(21) Appl. No.: 18/145,123

(22) Filed: Dec. 22, 2022

(65) Prior Publication Data

US 2024/0215092 A1    Jun. 27, 2024

(51) Int. Cl.
*H04W 76/15* (2018.01)
*H04W 28/082* (2023.01)

(52) U.S. Cl.
CPC ......... *H04W 76/15* (2018.02); *H04W 28/082* (2023.05)

(58) Field of Classification Search
CPC ...... H04W 76/15; H04W 28/082; H04L 45/24
See application file for complete search history.

(56) References Cited

U.S. PATENT DOCUMENTS

| | | | | |
|---|---|---|---|---|
| 7,835,301 | B1 * | 11/2010 | Maufer | H04W 24/02 370/254 |
| 2021/0144698 | A1 | 5/2021 | Kwon et al. | |
| 2021/0160347 | A1 | 5/2021 | Chu et al. | |
| 2021/0195540 | A1 | 6/2021 | Fischer | |
| 2021/0250963 | A1 | 8/2021 | Seok et al. | |
| 2021/0266891 | A1 | 8/2021 | Chu et al. | |
| 2021/0314292 | A1 | 10/2021 | Seok et al. | |
| 2021/0337564 | A1 | 10/2021 | Kwon et al. | |
| 2021/0360646 | A1 | 11/2021 | Chu et al. | |
| 2021/0377856 | A1 | 12/2021 | Chu et al. | |
| 2021/0385692 | A1 | 12/2021 | Kwon et al. | |
| 2022/0287122 | A1 * | 9/2022 | Wang | H04W 8/22 |
| 2023/0262768 | A1 * | 8/2023 | Ko | H04W 76/15 |
| 2023/0309146 | A1 * | 9/2023 | Alpert | H04W 74/04 |
| 2023/0327717 | A1 * | 10/2023 | Minotani | H04W 76/11 370/329 |
| 2024/0098560 | A1 * | 3/2024 | Huang | H04W 28/0942 |
| 2024/0259119 | A1 * | 8/2024 | Xia | H04B 17/345 |

\* cited by examiner

*Primary Examiner* — Sudesh M. Patidar
(74) *Attorney, Agent, or Firm* — Hewlett Packard Enterprise Patent Department

(57) ABSTRACT

In implementations of the present disclosure, a method is provided for multi-link operation (MLO) at multi-link devices (MLDs). A first MLD establishes a plurality of links on a radio band with a second MLD based on a primary service set identifier (SSID). The first MLD further generates a key for the plurality of links on the radio band based on the primary SSID, and performs transmission of a traffic flow with the second MLD at least based on the plurality of links and the key. In this way, with multiple links on the same radio band, a suitable link among the multiple links can be used for the transmission, thereby improving stability, utility and performance of links in the MLO.

12 Claims, 7 Drawing Sheets

MULTI-LINK OPERATION

BACKGROUND

Recently, the multi-link operation (MLO) has been introduced into the IEEE 802.11be Extremely High Throughput (EHT) to achieve the higher throughput, lower latency, and higher reliability. With the MLO, multiple links on different radio bands can be established between multi-link devices (MLDs), and thus the MLDs are allowed to transmit and/or receive data on the multiple links concurrently. For example, a first link on a 2.4 GHz band and a second link on a 5 GHz band between two MLDs can be aggregated to transmit and/or receive data at the same time.

BRIEF DESCRIPTION OF THE DRAWINGS

Implementations of the present disclosure may be understood from the following Detailed Description when read with the accompanying Figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

Figure 1:
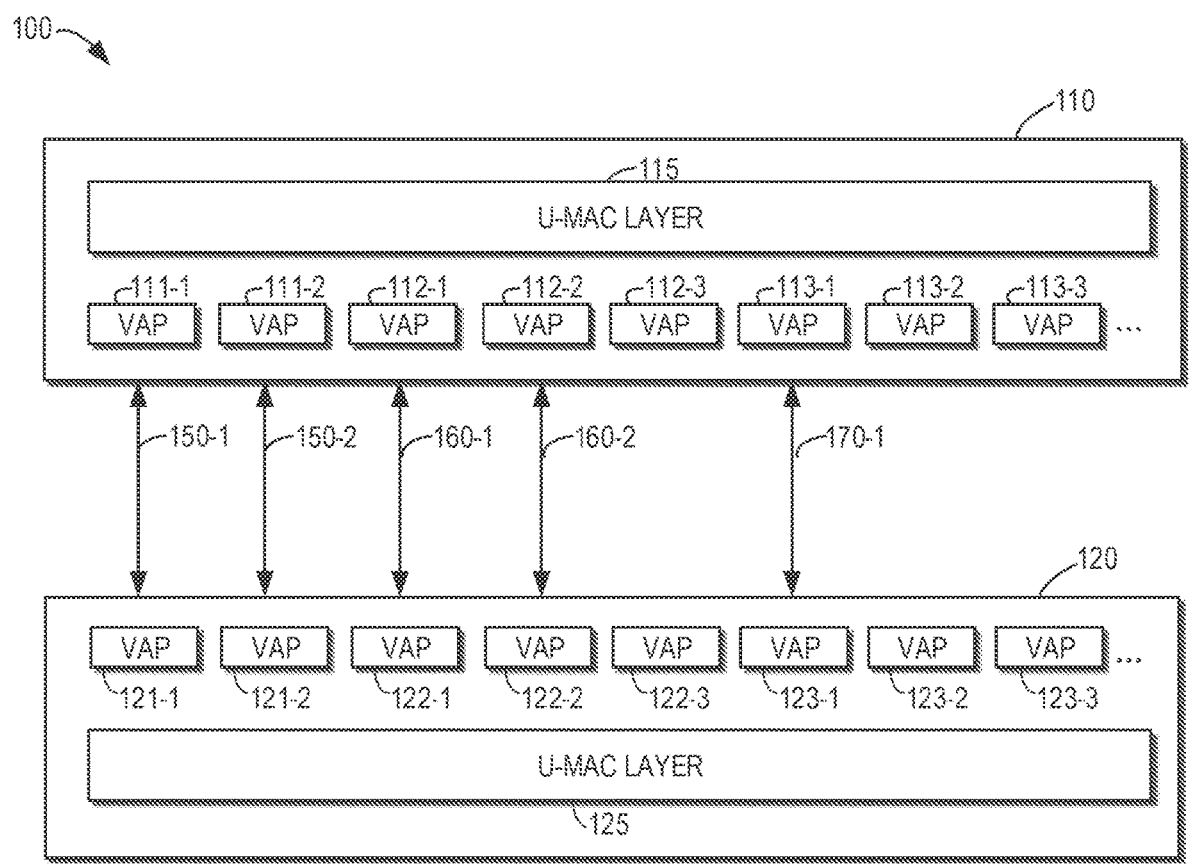
FIG. 1 illustrates an example environment in which example implementations of the present disclosure may be implemented.

As described above, in the MLO, the MLDs can establish multiple links on different radio bands and use these multiple links for simultaneous transmission and/or reception so as to achieve the higher throughput, lower latency, and higher reliability. However, in this case, the poor performance of one of the multiple links may worsen the performance of the MLDs. For example, if one of the multiple links is flapping due to a change of an internal configuration or interference, the link stability of the MLDs may be decreased, thereby worsening the simultaneous transmission and/or reception on multiple links. Therefore, it is desired to maintain the high performance of the multiple links between the MLDs.

Various example implementations of the present disclosure propose a solution for the MLO to maintain the performance of the multiple links of the MLDs. In this solution, the MLDs can establish multiple links on one radio band. In this way, the MLDs can select a suitable or optimal link of a plurality of links on the same radio band to transmit and/or receive data. For example, when one of two links on the same radio band is performing poorly, the MLDs can seamlessly switch to the other link on the same radio band to maintain the transmission between the MLDs. Therefore, with this solution, the stability, robustness and performance of the multiple links of MLDs can be improved.

According to implementations of the present disclosure, each of the plurality of links on the radio band can be established between a pair of corresponding virtual access points (VAPs) on the radio band supported by the MLDs. For example, a first MLD and a second MLD may establish a link on the radio band between a first VAP on the radio band supported by the first MLD and a second VAP on the radio band supported by the second MLD.

Each MLD may support one or more VAPs on a same radio band by using a physical AP on the radio band. The one or more VAPs are logical entities of the physical AP. Each of the one or more VAPs may operate as an individual physical AP to support a respective a basic service set (BSS) and have a respective service set identifier (SSID). The number of VAPs supported by the physical AP of the MLDs may change dynamically based on the configurations of the MLDs. As such, the maximum number of links established between the corresponding VAPs can be changed dynamically.

In implementations of the present disclosure, two MLDs can establish the plurality of links on the same radio band based on a primary SSID for the plurality of VAPs supported by the MLDs. For example, the MLDs may determine one of a plurality of SSIDs corresponding to the plurality of VAPs on the radio band as the primary SSID and use this primary SSID to establish the plurality of links on the radio band. The MLDs further generate a key for the plurality of links based on the primary SSID and then use the generated key and at least the plurality of links to perform secure data transmission between each other.

In this way, by using the primary SSID instead of different SSIDs corresponding to the plurality of VAPs to establish and secure the plurality of links on the same radio band, the MLDs can switch among the plurality of links on the same radio band to perform secure data transmission between each other, thereby improving the stability, robustness, and performance of the MLDs.

Example implementations of the present disclosure will be described in detail below with reference to the accompanying drawings. FIG. 1 illustrates an example environment 100 in which example implementations of the present disclosure may be implemented.

In the example environment 100, a first MLD 110 and a second MLD 120 each supports multiple VAPs on different radio bands. As shown in FIG. 1, the first MLD 110 supports a plurality of VAPs (e.g., VAPs 111-1, 111-2) on a first radio band, a plurality of VAPs (e.g., VAPs 112-1, 112-2, 112-3) on a second radio band, and a plurality of VAPs (e.g., VAPs 113-1, 113-2, 113-3) on a third radio band. Similarly, the second MLD 120 supports a plurality of VAPs (e.g., VAPs 121-1, 121-2) on the first radio band, a plurality of VAPs (e.g., VAPs 122-1, 122-2, 122-3) on the second radio band, and a plurality of VAPs (e.g., VAPs 123-1, 123-2, 123-3) on the third radio band.

In some implementations, both of the first MLD 110 and the second MLD 120 may be equipped with multiple radios. For example, the first radio band may be 2.4 GHz, the second radio band may be 5 GHz, and the third radio band may be 6 GHz. Alternatively, the first MLD 110 and/or the second MLD 120 may be equipped with only two different radios. For example, the first MLD 110 may support VAPs 111-1, 111-2, 112-1, 112-2 and 112-3 on a radio band of 2.4 GHz and support VAPs 113-1, 113-2 and 113-3 on the other radio band of 5 GHz.

As described above, according to the implementations of the present disclosure, the first MLD 110 and the second MLD 120 establish multiple links on different radio bands and establish a plurality of links at least on one of the different radio bands. As shown in FIG. 1, the first MLD 110 and the second MLD 120 may establish two links (e.g., links 150-1, 150-2) on the first radio band, two links (link 160-1, 160-2) on the second radio band and one link 170-1 on the third radio band.

In some embodiments, the MLDs may establish the plurality of links on the same radio band between corresponding VAPs on the same radio band supported by the MLDs. For example, the link 150-1 may be established between the corresponding VAP 111-1 and VAP 121-1 on the first radio band. The link 160-1 may be established between the corresponding VAP 112-1 and VAP 122-1 on the second radio band.

Moreover, as shown in FIG. 1, each MLD may have a common upper media access control (U-MAC) layer to process packets associated with the multiple VAPs supported by itself. For example, the multiple VAPs supported by physical AP(s) in the first MLD 110 may correspond to a U-MAC layer 115 of the first MLD 110. Similarly, the multiple VAPs supported by physical AP(s) in the second MLD 120 may correspond to a U-MAC layer 125 of the second MLD 120.

In this case, even though each of the multiple VAPs supported by the individual MLD has a respective MAC address (i.e., a respective basic service set identifier, BSSID), the individual MLD itself may have a MAC address (also referred to as an MLD MAC address) for identification in the communication environment. For example, the first MLD 110 may have a first MLD MAC address and the second MLD 120 may have a second MLD MAC address different from the first MLD MAC address. The MLD MAC address may be one of the MAC addresses of the multiple VAPs. Alternatively, the MLD MAC address may be a MAC address different from the MAC addresses of the multiple VAPs.

In some implementations, the first MLD 110 may be a mesh portal (also referred to as an MLD mesh portal or a portal MLD), and the second MLD 120 may be a mesh point (also referred to as an MLD mesh point or a point MLD) in a Wi-Fi mesh network. The MLD mesh portal may be connected to a wired network and provide wireless connection to the MLD mesh point. The MLD mesh point may, in turn, provide a wireless connection to a station such as a user device. Alternatively, the first MLD 110 and the second MLD 120 may be any other suitable MLDs supporting the MLO.

In the example environment 100, the first MLD 110 and the second MLD 120 can further negotiate a key for the multiple links established on the different radio bands and use the key to enable secure data transmission on the multiple links concurrently.

It is to be noted that the numbers of VAPs, links, and MLDs shown in FIG. 1 are not limiting. The communication environment in which example implementations of the present disclosure can be implemented may be configured differently from the example environment shown in FIG. 1. For example, the plurality of VAPs of the first MLD 110 can further support link(s) to another device other than the second MLD 120.

Figure 2:
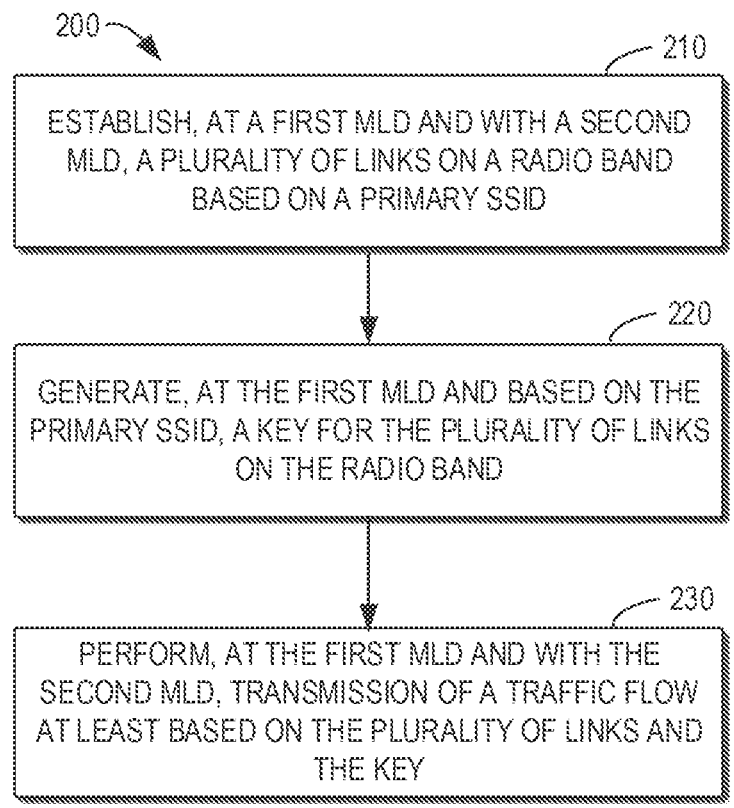
FIG. 2 illustrates a flowchart of an example method in accordance with some example implementations of the present disclosure.

FIG. 2 illustrates a flowchart of an example method 200 in accordance with some example implementations of the present disclosure. For the purpose of discussion, the method 200 will be described with reference to FIG. 1 to discuss example implementations of the multi-link operation at the first MLD 110. While only some blocks are shown in FIG. 2, the method 200 may comprise other operations described herein.

At block 210, the first MLD 110 establishes a plurality of links on a radio band with the second MLD 120 based on a primary SSID, wherein the plurality of links correspond to a plurality of VAPs on the radio band, and the plurality of VAPs on the radio band correspond to a plurality of different SSIDs. With reference to FIG. 1 and for the purpose of discussion, the plurality of links on the radio band may comprise the link 150-1 between the VAP 111-1 and VAP 121-1 and the link 150-2 between VAP 111-2 and VAP 121-2 on the first radio band. The first radio band may be 2.4 GHz, 5 GHz, or 6 GHz.

In some implementations, the primary SSID may be an SSID of the plurality of different SSIDs of the corresponding VAPs on the radio band. For example, in a case where VAP 111-1 corresponds to SSID_x and VAP 111-2 corresponds to SSID_y, the primary SSID may be determined as SSID_x or SSID_y. Alternatively, the primary SSID may be an SSID different from the plurality of different SSIDs. The first MLD 110 and the second MLD 120 may negotiate a new SSID as the primary SSID for the establishment of the plurality of links on the radio band.

In some implementations, the first MLD 110 may select one of the plurality of different SSIDs of the corresponding VAPs on the radio band as the primary SSID and inform the second MLD 120 of the primary SSID. Alternatively or in addition, the first MLD 110 and the second MLD 120 may be informed of the primary SSID by another device. As such, both of the first MLD 110 and the second MLD 120 can be aware of the primary SSID and use the primary SSID to establish the multiple links on the radio bands between each other.

In some implementations, the first MLD 110 may establish the plurality of links on the radio band based on a probe request from the second MLD 120. The probe request may comprise a field indicating the establishment of at least two links on the radio band between the first MLD 110 and the second MLD 120.

In some implementations, a newly-defined one-bit field may be contained in the probe request to request the establishment of two or more links on the same radio band. Alternatively, one or more fields may be reused in the probe request to request the establishment of two or more links on the same radio band.

In some implementations, the first MLD 110 may receive a single probe request comprising a field indicating the establishment of two or more links on the same radio band. Alternatively, the first MLD 110 may first receive a probe request for establishing a single link on the radio band and then receive a further probe request for establishing a further link or a back-up link on the same radio band. As an example, the first MLD 110 may receive, from the second MLD 120, a first probe request for establishing a link on the radio band. Based on receiving the first probe request, the first MLD 110 may establish a first link on the radio band with the second MLD 120.

The first MLD 110 may establish the first link with the second MLD 120 in accordance with a procedure as described in the IEEE 802.11be. For example, the first MLD 110 may check if the first probe request comprises a correct MLD MAC address. Additionally, the first MLD 110 may check if the first probe request comprises a correct mesh vender information element (IE). If so, the first MLD 110 may perform the link establishment with the second MLD 120. The details of the procedure of link establishment in the MLO are omitted herein.

After the first link is established on the radio band, the first MLD 110 may receive, from the second MLD 120, a second probe request comprising a field indicating the establishment of a back-up link on the same radio band. For example, the second probe request may comprise a certain bit with a value of 1 to indicate the establishment of the back-up link on the same radio band. Based on receiving the second probe request, the first MLD 110 and the second MLD 120 may establish the back-up link on the same radio band.

In some implementations, the probe request indicating the establishment of the further link or the back-up link on the same radio band may be transmitted by the second MLD 120 in response to a beacon frame received from the first MLD 110. In other words, the second MLD 120 may check the beacon frames received from the first MLD 110. If the second MLD 120 determines that a received beacon frame satisfies predetermined requirements, the second MLD 120 may transmit the probe request for the establishment of the further link or the back-up link to the first MLD 110.

For example, after the first link is established on the radio band, the second MLD 120 may continue to parse the beacon frames transmitted by the first MLD 110. The second MLD 120 may check the MLD MAC address and the BSSID in the beacon frames to determine if the received beacon frames satisfy the predetermined requirements. Additionally, the second MLD 120 may check the mesh vender IE in the beacon frames.

If the second MLD 120 determines that a received beacon frame comprises the same MLD MAC address as the established first link and the beacon frame comprises a BSSID different from the BSSID of the first link, the second MLD 120 may determine that another VAP on the same radio band supported by the first MLD 110 is available. In this case, the second MLD 120 may send another probe request for establishing a back-up link on the radio band by using the available VAP.

In some implementations, the second MLD 120 may receive a probe response from the first MLD 110 as a response to the probe request. The probe response may comprise an indication of using the primary SSID (e.g., the SSID used for previous link establishment) to establish the back-up link. As such, the first MLD 110 and the second MLD 120 are allowed to use the same SSID for the establishment of the multiple links between each other.

At block 220, the first MLD 110 generates a key for the plurality of links on the radio band based on the primary SSID. Specifically, both the first MLD 110 and the second MLD 120 generate the same key for the plurality of links on the radio band. The generated key can be used to ensure the secure data transmission between the first MLD 110 and the second MLD 120.

In some implementations, the key may be generated and used in an extensible authentication protocol over the local area network (EAPOL) 4-way handshake. The key may be a pairwise master key (PMK) and may be generated at least based on the primary SSID and a pre-shared key (PSK). Alternatively, the key may be any other suitable key for securing the data transmission between the MLDs. By using the primary SSID to generate the key, concurrent and unicast transmission on different links on one or more radio bands can be secured.

At block 230, the first MLD 110 performs transmission of a traffic flow with the second MLD 120, at least based on the plurality of links and the key. It is to be noted that, in the MLO, the MLDs may use the multiple links on different radio bands to perform concurrent transmissions. However, the MLDs may not use two or more links on the same radio band to perform the transmission at the same time.

In some implementations, the first MLD 110 may perform the transmission with the second MLD 120 by switching among the plurality of links on the radio band to perform the transmission. For example, the first MLD 110 and the second MLD 120 may first perform the transmission on a first link of the plurality of links for a first time period and then switch to a second link of the plurality of links to perform the transmission for a second time period.

In some implementations, the first MLD 110 may switch among the plurality of links on the same radio band based on the load-balancing of the plurality of corresponding VAPs on the radio band. The first MLD 110 may determine the corresponding loads of the plurality of VAPs on the same radio band and switch among the plurality of links based on a comparison of loads of the plurality of corresponding VAPs. For example, the first MLD 110 may not use a link corresponding to a highly-loaded VAP to perform the transmission.

Alternatively, or in addition, the first MLD 110 may switch among the plurality of links on the same radio band based on the link performance of the plurality of links. Alternatively, or in addition, the first MLD 110 may switch to a suitable link of the plurality of links on the same radio band due to any other reasonable considerations, such as management efficiency.

Figure 3:
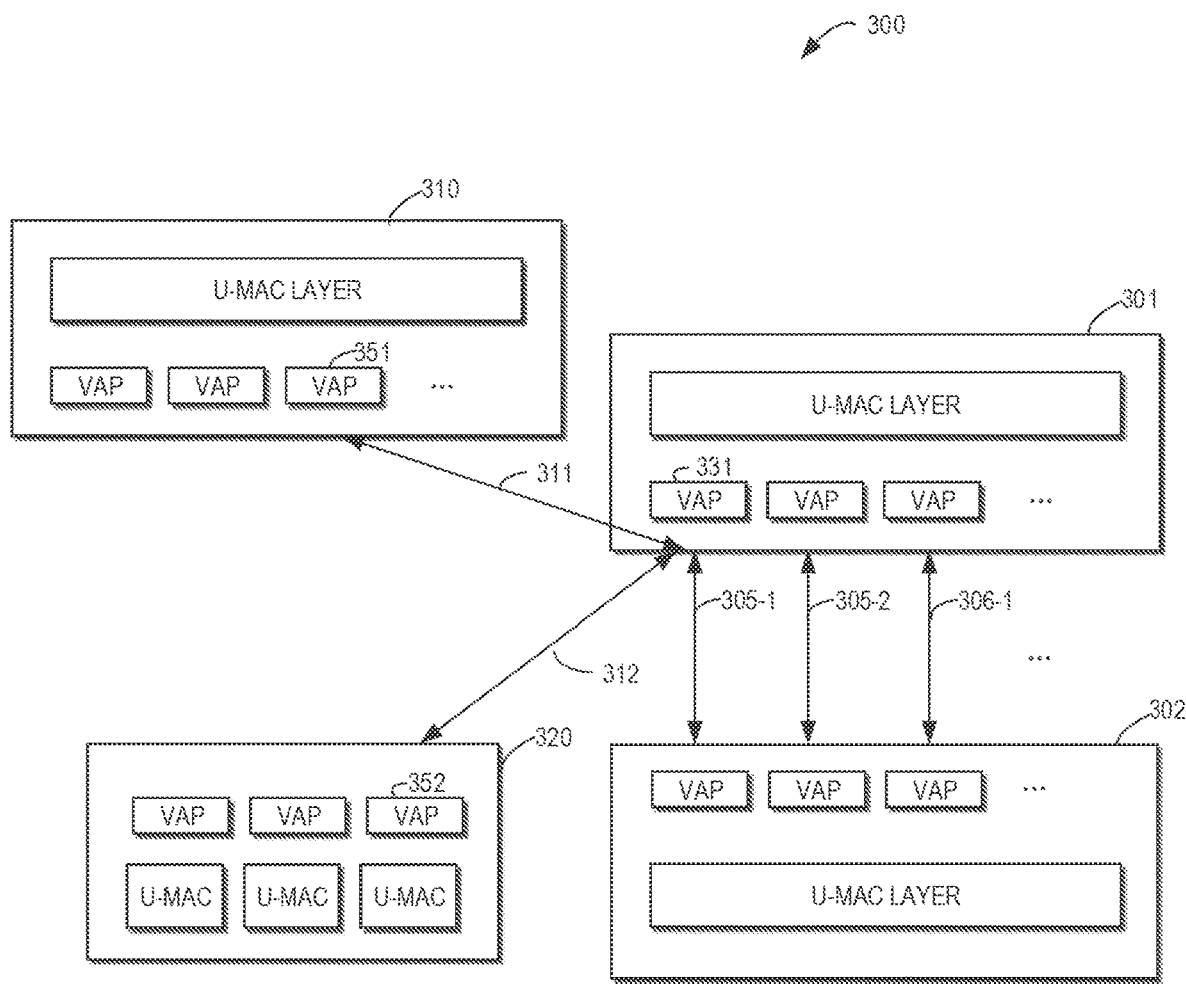
FIG. 3 illustrates a schematic diagram of an example process of switching among links on a same radio band in accordance with some example implementations of the present disclosure.

FIG. 3 illustrates a schematic diagram of an example process 300 of switching among links on the same radio band in accordance with some example implementations of the present disclosure. As shown in FIG. 3, multiple links are established between an MLD 301 and an MLD 302. With reference to FIG. 1, the MLD 301 may be a simpler version of the first MLD 110, and the MLD 302 may be a simpler version of the second MLD 120. The MLD 301 and the MLD 302 may establish the links 305-1 and 305-2 on the first radio band and establish the link 306-1 on the second radio band.

As shown in FIG. 3, in addition to the MLD 302, the MLD 301 may establish links with other devices such as a third device 310 and a fourth device 320. For example, the MLD 301 may be a mesh portal and each of the MLD 302, third device 310 and fourth device 320 may be a mesh point. The third device 310 may be an MLD and the fourth device 320 may be a legacy device not supporting the MLO.

Similarly, the MLD 301 may establish links between corresponding VAPs with the third device 310 or the fourth device 320. For example, the MLD 301 and the third device 310 may establish a link 311 between a VAP 331 and a VAP 351. The MLD 301 and the fourth device 320 may establish a link 312 between the VAP 331 and a VAP 352. In this case, the VAP 331 of the MLD 301 may support the link 305-1 to the MLD 302, the link 311 to the third device 310 and the link 312 to the fourth device 320.

In some implementations, the MLD 301 may perform the transmission of the traffic flow with the MLD 302 by switching among the links 305-1 and 305-2 on the first radio band based on the load-balancing of the corresponding VAPs. For example, the MLD 301 may select the link 305-2 instead of the link 305-1 to perform the transmission between the MLD 301 and MLD 302 due to a heavy load of the VAP 331.

Alternatively or in addition, the MLD 301 may perform the transmission with the MLD 302 based on a plurality of links (e.g., links 305-1 and 305-2) on the first radio band and at least one link (e.g., link 306-1) on the second radio band different from the first radio band. In other words, the MLDs 301 and 302 may perform the transmission of the traffic flow by using each link on two or more different radio bands concurrently. As an example, the MLDs 301 and 302 may concurrently transmit and/or receive data on the links 305-1 and 306-1. As another example, the MLDs 301 and 302 may concurrently transmit and/or receive data on the links 305-2 and 306-1.

In some implementations, when performing the transmission on multiple links on different radio bands, the MLDs may determine a distribution of the traffic flow to the multiple links. The MLDs may perform the transmission of the traffic flow based on the distribution to improve the efficiency of the transmission. For example, the MLD 301 may determine the distribution of the traffic flow to the link 305-1 and/or link 305-2 on the first radio band and the link 306-1 on the second radio band.

In some implementations, two MLDs may determine the distribution of the traffic flow based on an interference link transmitting a packet on a radio band associated with one or both of the two MLDs. As an example, the interference link may be established between the two MLDs. As another example, the interference link may be established between either of the two MLDs and another device. As yet another example, the interference link may be established between two devices other than the two MLDs. The device(s) other than the two MLDs may be an MLD or a legacy device not supporting the MLO.

Figure 4:
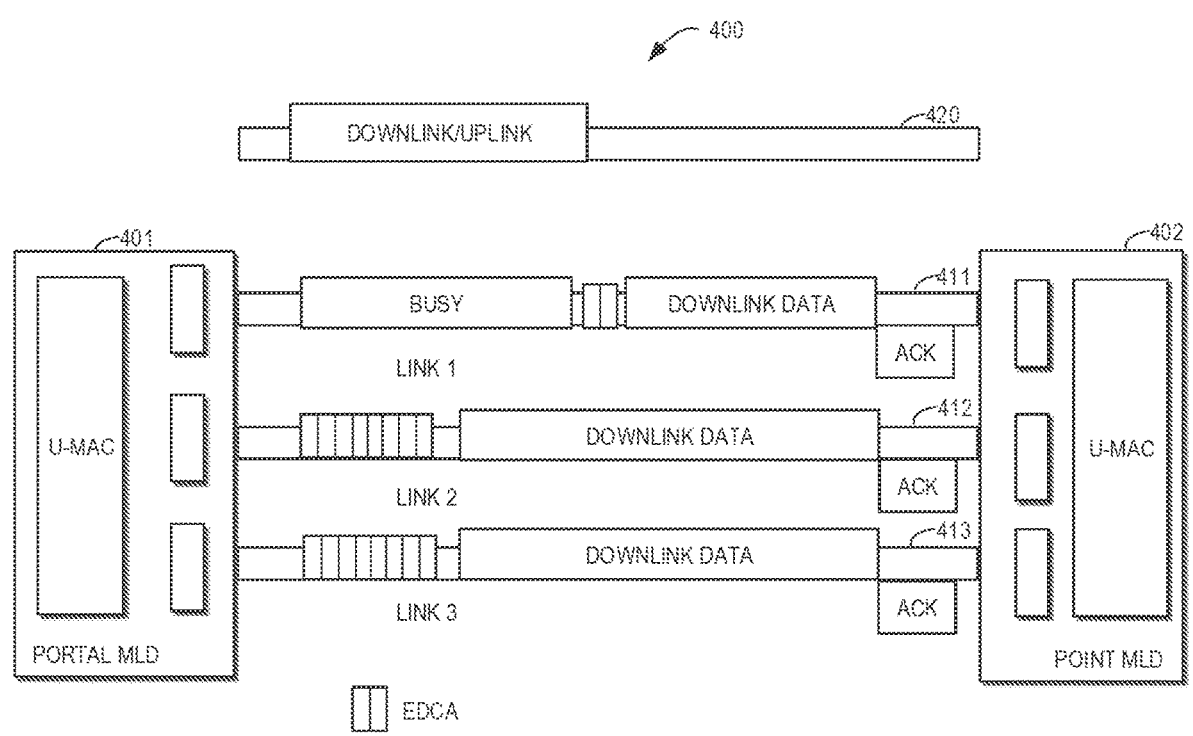
FIG. 4 illustrates a schematic diagram of an example process of distributing a traffic flow on different radio bands in accordance with some example implementations of the present disclosure.

FIG. 4 illustrates a schematic diagram of an example process 400 of distributing a traffic flow on different radio bands in accordance with some example implementations of the present disclosure. FIG. 4 illustrates a portal MLD 401 and a point MLD 402 in a Wi-Fi mesh network. With reference to FIG. 1, the portal MLD 401 may be a simpler version of the first MLD 110, and the point MLD 402 may be a simpler version of the second MLD 120.

As shown in FIG. 4, either the portal MLD 401 or the point MLD 402 may be equipped with three radios and have a respective U-MAC layer. The portal MLD 401 and the point MLD 402 may establish multiple links on three radio bands corresponding to the three radios. For example, the portal MLD 401 and the point MLD 402 may establish a link 411 on a first radio band of 5 GHz, a link 412 on a second radio band of 2.4 GHz, and a link 413 on a third radio band of 6 GHz.

Moreover, FIG. 4 illustrates an interference link 420 between devices other than the portal MLD 401 and the point MLD 402. The interference link 420 and the link 411 may be on the same radio band of 5 GHz. The interference link 420 may be currently transmitting a downlink or uplink packet.

Since the interference link 420 and the link 411 are on the same radio band, contention-based channel access (e.g., enhanced distributed channel access, EDCA) may be performed for the interference link 420 and the link 411. For example, if the interference link 420 succeeds in the channel access contention, a packet may be transmitted on the interference link 420 first, and the link 411 may not be allowed to perform transmission during a transmission period of the packet. The link 411 may be determined as busy during the transmission period of the packet.

In some implementations, as shown in FIG. 4, the portal MLD 401 and the point MLD 402 may operate in a non-simultaneous transceiver (NSTR) mode, which is also referred to as a synchronous mode. In the NSTR mode, the multiple links on different radio bands may not be allowed to receive and send data simultaneously. Instead, the multiple links can only receive or send data at the same time.

For example, the links 411, 412, and 413 between the portal MLD 401 and the point MLD 402 operating in the NSTR mode may be allowed to transmit downlink data concurrently. In contrast, none of the links 411, 412, and 413 may be allowed to transmit uplink data while the other links are transmitting downlink data.

In some implementations, in the NSTR mode, the links 411, 412, and 413 may be required to complete the transmission at the same time and the acknowledgement (ACK) for the transmission may be transmitted at the same time. In this case, a duration of the transmission period (also referred to as a transmission duration) of the packet on the interference link 420 may be determined and used for the determination of the distribution of the traffic flow to the links 411, 412, and 413.

For example, the MLD 401 may divide the traffic flow of a downlink packet into three portions corresponding to the three links 411, 412, and 413. The MLD 401 may consider the transmission duration of the packet on the interference link 420 to determine the distribution of the traffic flow since the link 411 cannot be used for transmission during the transmission duration of the packet. Additionally, the MLD 401 may determine the distribution of the traffic flow to the multiple links on different radio bands based on the capabilities of the multiple links. The capabilities of the links may depend on, e.g., a modulation coding scheme (MCS) or link quality.

In this way, by considering the transmission duration of the packet being transmitted on the inference link, the traffic flow between the MLDs may be distributed to the multiple links on the different radio bands accurately, thereby improving airtime fairness and utility of the multiple links of the MLDs.

Figure 5:
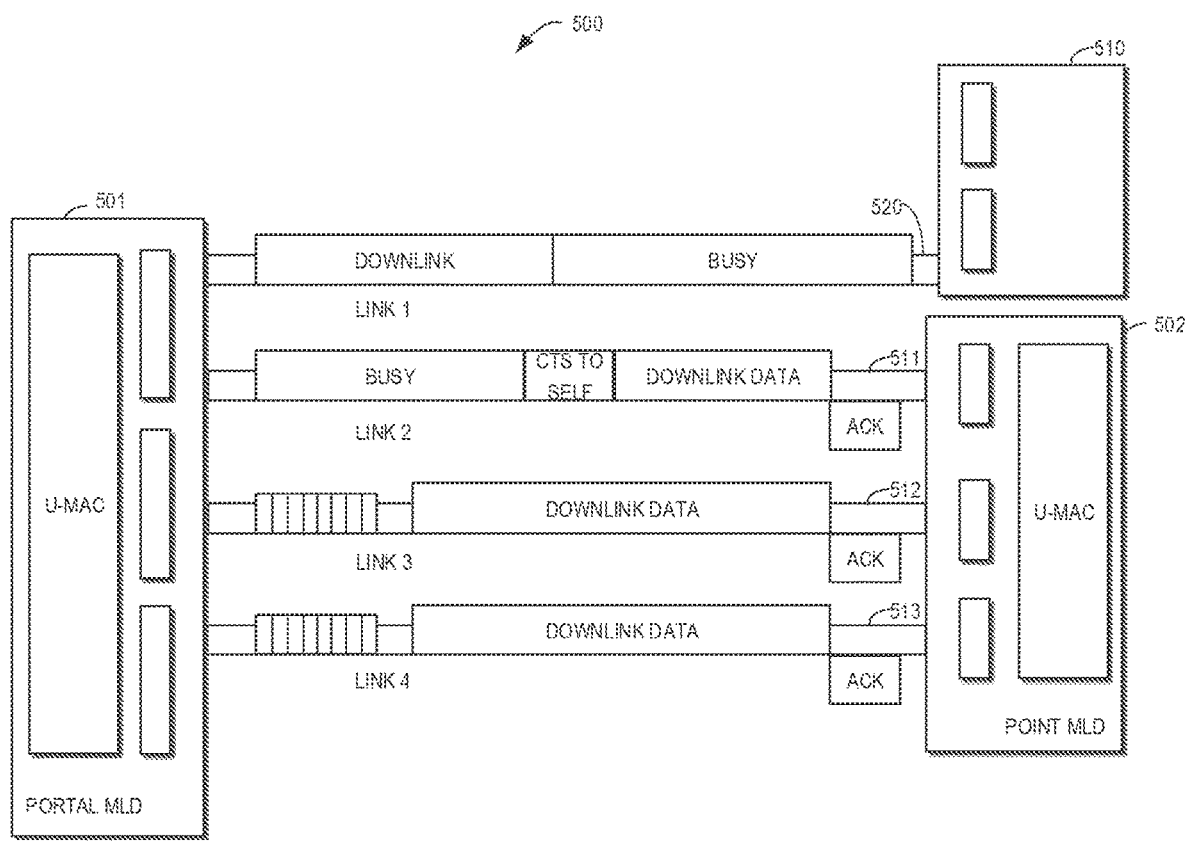
FIG. 5 illustrates a schematic diagram of another example process of distributing a traffic flow on different radio bands in accordance with some example implementations of the present disclosure.

FIG. 5 illustrates a schematic diagram of another example process 500 of distributing a traffic flow on different radio bands in accordance with some example implementations of the present disclosure. FIG. 5 illustrates a portal MLD 501 and a point MLD 502 in a Wi-Fi mesh network. With reference to FIG. 1, the portal MLD 501 may be a simpler version of the first MLD 110, and the point MLD 502 may be a simpler version of the second MLD 120.

The portal MLD 501 and the point MLD 502 may establish multiple links on different radio bands. For example, the portal MLD 501 and the point MLD 502 may establish a link 511 on a first radio band of 5 GHz, a link 512 on a second radio band of 2.4 GHz, and a link 513 on a third radio band of 6 GHz.

Moreover, an interference link 520 may be established between the portal MLD 501 and a device 510. The device 510 may be an MLD or a legacy device not supporting the MLO. For the purpose of illustration, the interference link 520 and the link 511 may be on the same radio band of 5 GHz.

As shown in FIG. 5, the portal MLD 501 and the point MLD 502 may operate in the NSTR mode, and the links 511, 512, and 513 are transmitting downlink data at the same time. As discussed above with reference to FIG. 4, the EDCA may be performed for the interference link 520 and the link 511 on the same radio band. For example, if the interference link 520 succeeds in the contention, a packet may be transmitted on the interference link 520 first, and the link 511 may be determined as busy during a transmission period of the packet on the interference link 520.

Since the interference link 520 and the link 511 are both associated with the portal MLD 501, after the transmission of the packet on the interference link 520 is complete, the portal MLD 501 may not need to perform the EDCA for the radio band of 5 GHz again. In some implementations, the portal MLD 501 may directly use the link 511 to transmit a downlink packet after transmitting a clear to send (CTS)-to-self frame.

Figure 6:
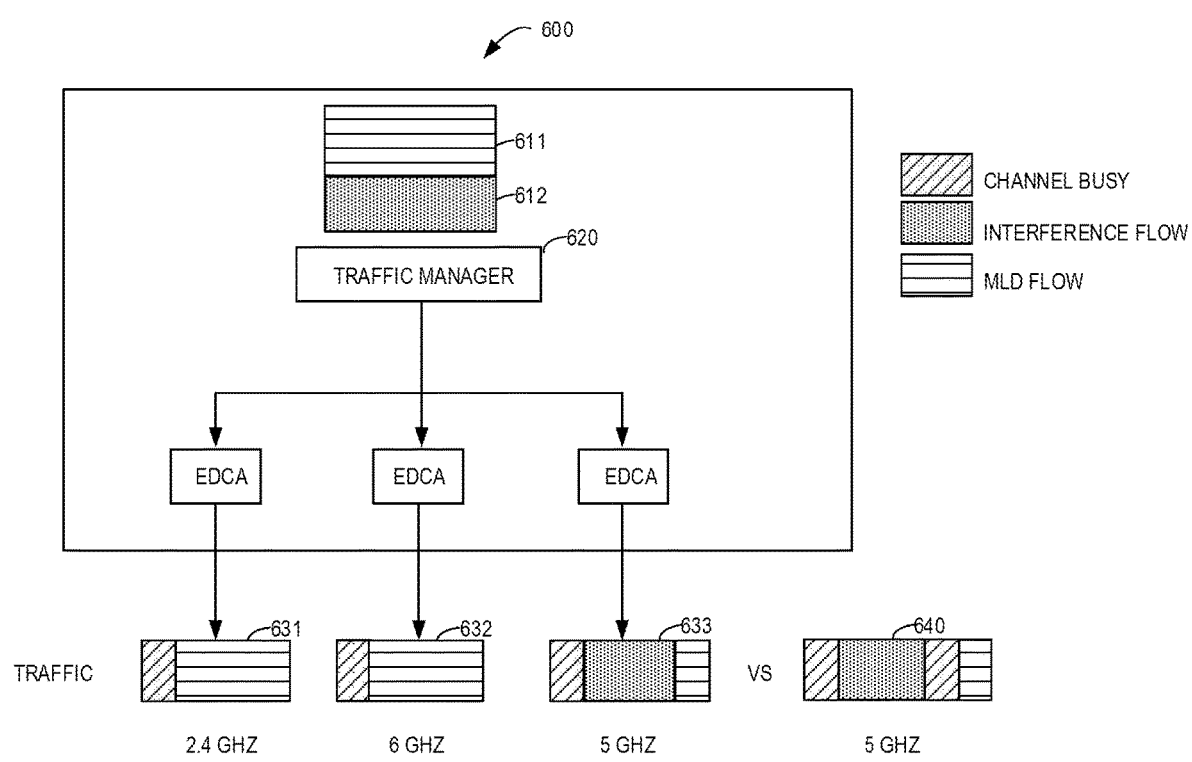
FIG. 6 illustrates a schematic diagram of an example traffic schedule process of a traffic flow on different radio bands in accordance with some example implementations of the present disclosure.

FIG. 6 illustrates a schematic diagram of an example traffic schedule process 600 of a traffic flow on different radio bands in accordance with some example implementations of the present disclosure. As shown in FIG. 6, the traffic flow to be distributed to the different radio bands may comprise an MLD flow 611 to be performed between the MLDs and an interference flow 612 associated with either of the MLDs (e.g., the MLD 501 in FIG. 5). The interference flow 612 may be transmitted on a radio band on which the associated MLD (e.g., MLD 501) performs the transmission of a portion of the MLD flow 611.

The MLD flow 611 and the interference flow 612 may be scheduled by a traffic manager 620 (e.g., the U-MAC layer) of the MLD. The traffic manager 620 may perform the EDCA per radio band and determine a distribution of a traffic flow to the multiple links on the different radio bands.

As shown in FIG. 6, a portion of the traffic flow may be scheduled to be transmitted on a link on the 2.4 GHz band, as shown in block 631. As discussed with reference to the link 512 in FIG. 5, the link 512 on the 2.4 GHz band may be busy in a first time period due to contention-based channel access. After the contention is successful, the link 512 on the 2.4 GHz band may be allowed to transmit a portion of the MLD flow 611 in a second time period.

Similarly, a portion of the traffic flow may be scheduled to be transmitted on a link on the 6 GHz band, as shown in block 632. As discussed with reference to the link 513 in FIG. 5, the link 513 on the 6 GHz band may be busy in a first time period due to the contention-based channel access and may be allowed to transmit a portion of the MLD flow 611 in a second time period.

Moreover, a portion of the traffic flow may be scheduled to be transmitted on the 5 GHz band, as shown in block 633. As discussed with reference to the link 511 and interference link 520 in FIG. 5, the links on the 5 GHz band may be busy in a first time period due to the contention-based channel access. After the interference link 520 succeeds in the contention, the interference link 520 may be allowed to transmit the interference flow 612 in a second time period. After the transmission period of the packet on the interference link 520 is complete, the link 511 may be allowed to transmit a portion of the MLD flow 611 in a third time period without the EDCA.

In contrast, in a case where the interference flow 612 is to be performed between devices other than the MLDs, as discussed with reference to FIG. 4, a portion of the traffic flow on the 5 GHz band may be scheduled, as shown in block 640. Specifically, the interference link 420 and the link 411 on the 5 GHz band may be busy in a first time period due to the contention-based channel access. After the interference link 420 succeeds in the contention, the interference link 420 may be allowed to transmit the interference flow 612 in a second time period. After the transmission period of the packet on the interference link 420 is complete, the link 411 on the 5 GHz band may be busy in a third time period due to a further contention-based channel access procedure. After the link 411 succeeds in the contention, the link 411 may be allowed to transmit a portion of the MLD flow 611 in a fourth time period.

Figure 7:
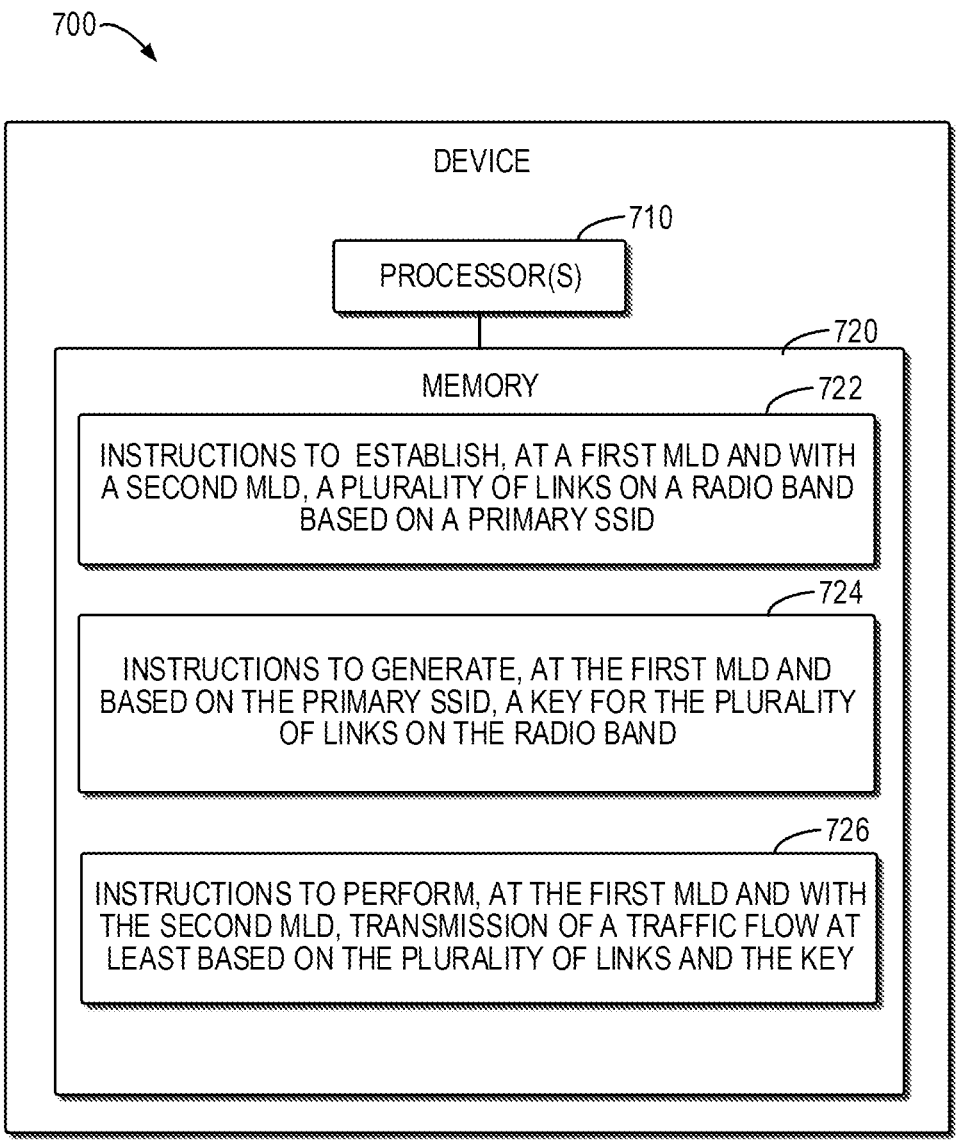
FIG. 7 illustrates a block diagram of an example MLD according to implementations of the present disclosure.

FIG. 7 illustrates a block diagram 700 of an MLD according to implementations of the present disclosure. For the purpose of discussion, the block diagram 700 will be described with reference to FIG. 1 to discuss example implementations of the first MLD 110. The first MLD 110 comprises a processor 710 and a memory 720 coupled to the processor 710. The memory 720 stores instructions 722, 724, and 726 to cause the processor 710 to implement a method to be performed at the first MLD 110. The memory 720 stores instructions 722 to establish, at a first MLD and with a second MLD, a plurality of links on a radio band based on an SSID, and the plurality of links correspond to a plurality of VAPs on the radio band, and the plurality of VAPs on the radio band correspond to a plurality of different SSIDs. The memory 720 stores instructions 724 to generate, at the first MLD and based on the primary SSID, a key for the plurality of links on the radio band. The memory 720 stores instructions 726 to perform, at the first MLD and with the second MLD, the transmission of a traffic flow, at least based on the plurality of links and the key.

With these implementations, by establishing a plurality of links on the same radio band, a suitable link may be selected from the plurality of links for the transmission, thereby improving the stability, utility, and performance of the multiple links of the MLDs. Moreover, by considering the transmission duration for the interference link, the traffic flow may be distributed to different radio bands efficiently.

The present disclosure also provides at least one computer program product tangibly stored on a non-transitory computer-readable storage medium. The computer program product includes program codes or instructions which can be executed to carry out the method as described above.

While some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description and a better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a computer-readable medium may be any tangible medium that may contain or store a program for use by or in connection with an instruction execution system, apparatus, or device. The computer-readable medium may be a computer-readable signal medium or a computer-readable storage medium. A computer-readable medium may include but is not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method, comprising:
   establishing, at a first multi-link device (MLD) and with a second MLD, a plurality of links on a first radio band and a second radio band based on a primary service set identifier (SSID), wherein the plurality of links correspond to a plurality of virtual access points (VAPs) on the first or second radio band, and the plurality of VAPs on the first or second radio band are associated with a plurality of different SSIDs, wherein the primary SSID is selected from the plurality of different SSIDs, and wherein the second radio band is different from the first radio band;
   generating, at the first MLD and based on the primary SSID, a key for the plurality of links on the first and second radio band; and
   performing, at the first MLD and with the second MLD, transmission of a traffic flow at least based on the key and the plurality of links on the first radio band and at least one link on the second radio band between the first MLD and the second MLD;
   determining, at the first MLD, a distribution of the traffic flow to the plurality of links and the at least one link by:
      determining, at the first MLD, a duration of a busy period of the first or second radio band, wherein the busy period comprises other devices utilizing the first or second radio band;
      determining, at the first MLD, the distribution of the traffic flow based on the duration of the busy period and capabilities of the plurality of links on the first radio band and the at least one link on the second radio band; and
   performing, at the first MLD and with the second MLD, the transmission of the traffic flow based on the distribution of the traffic flow.

2. The method according to claim 1, wherein establishing the plurality of links on the first and second radio band based on the primary SSID comprises:
   establishing, at the first MLD, the plurality of links on the first and second radio band based on a probe request from the second MLD, wherein the probe request comprises a field indicating request for establishment of at least two links on the first and second radio band between the first MLD and the second MLD.

3. The method according to claim 1, further comprising:
   transmitting, from the first MLD to the second MLD, an indication of establishing the plurality of links and generating the key based on the primary SSID.

4. The method according to claim 1, wherein performing the transmission of the traffic flow at least based on the plurality of links and the key comprises:
   performing, at the first MLD and with the second MLD, the transmission of the traffic flow by switching among the plurality of links on the first and second radio band based on at least one of the following:
      load-balancing of the plurality of VAPs on the first or second radio band, or
      link performance of the plurality of links.

5. The method according to claim 1, wherein the first MLD and the second MLD operate in a non-simultaneous transceiver (NSTR) mode.

6. The method according to claim 1, wherein the first MLD is a mesh portal and the second MLD is a mesh point.

7. A first multi-link device (MLD), comprising:
   at least one processor; and
   a memory coupled to the at least one processor, the memory storing instructions to cause the at least one processor to perform acts comprising:
      establishing, at the first MLD and with a second MLD, a plurality of links on a first radio band and a second radio band based on a primary service set identifier (SSID), wherein the plurality of links correspond to a plurality of virtual access points (VAPs) on the first or second radio band, and the plurality of VAPs on the first or second radio band are associated with a plurality of different SSIDs, wherein the primary SSID is selected from the plurality of different SSIDs, and wherein the second radio band is different from the first radio band;
      generating, at the first MLD and based on the primary SSID, a key for the plurality of links on the first and second radio band; and
      performing, at the first MLD and with the second MLD, transmission of a traffic flow at least based on the key and the plurality of links on the first radio band and at least one link on the second radio band between the first MLD and the second MLD;
      determining, at the first MLD, a distribution of the traffic flow to the plurality of links and the at least one link by:
         determining, at the first MLD, a duration of a busy period of the first or second radio band, wherein the busy period comprises other devices utilizing the first or second radio band;
         determining, at the first MLD, the distribution of the traffic flow based on the duration of the busy period and capabilities of the plurality of links on the first radio band and the at least one link on the second radio band; and performing, at the first MLD and with the second MLD, the transmission of the traffic flow based on the distribution of the traffic flow.

8. The first MLD according to claim 7, wherein establishing the plurality of links on the first and second radio band based on the primary SSID comprises:

establishing, at the first MLD, the plurality of links on the first and second radio band based on a probe request from the second MLD, wherein the probe request comprises a field indicating request for establishment of at least two links on the first and second radio band between the first MLD and the second MLD.

9. The first MLD according to claim 7, wherein the acts further comprise:

transmitting, from the first MLD to the second MLD, an indication of establishing the plurality of links and generating the key based on the primary SSID.

10. The first MLD according to claim 7, wherein performing the transmission of the traffic flow at least based on the plurality of links and the key comprises:

performing, at the first MLD and with the second MLD, the transmission of the traffic flow by switching among the plurality of links on the first and second radio band based on at least one of the following:
   load-balancing of the plurality of VAPs on the first or second radio band, or
   link performance of the plurality of links.

11. A non-transitory computer-readable storage medium comprising instructions stored thereon which, when executed by a processor, cause the processor to:

establish, at a first multi-link device (MLD) and with a second MLD, a plurality of links on a first radio band and a second radio band based on a primary service set identifier (SSID), wherein the plurality of links correspond to a plurality of virtual access points (VAPs) on the first or second radio band, and the plurality of VAPs on the first or second radio band are associated with a plurality of different SSIDs, wherein the primary SSID is selected from the plurality of different SSIDs, and wherein the second radio band is different from the first radio band;

generate, at the first MLD and based on the primary SSID, a key for the plurality of links on the first and second radio band; and perform, at the first MLD and with the second MLD, transmission of a traffic flow at least based on the key and the plurality of links on the first radio band and at least one link on the second radio band between the first MLD and the second MLD;

determining, at the first MLD, a distribution of the traffic flow to the plurality of links and the at least one link by:
   determining, at the first MLD, a duration of a busy period of the first or second radio band, wherein the busy period comprises other devices utilizing the first or second radio band;
   determining, at the first MLD, the distribution of the traffic flow based on the duration of the busy period and capabilities of the plurality of links on the first radio band and the at least one link on the second radio band; and performing, at the first MLD and with the second MLD, the transmission of the traffic flow based on the distribution of the traffic flow.

12. The non-transitory computer-readable storage medium of claim 11, wherein the instructions to establish the plurality of links on the first and second radio band based on the primary SSID further comprise instructions which, when executed by the processor, further cause the processor to:

establish, at the first MLD, the plurality of links on the first and second radio band based on a probe request from the second MLD, wherein the probe request comprises a field indicating request for establishment of at least two links on the first and second radio band between the first MLD and the second MLD.

* * * * *